(12) United States Patent
Sasagawa et al.

(10) Patent No.: US 10,615,406 B2
(45) Date of Patent: Apr. 7, 2020

(54) NEGATIVE ELECTRODE FOR LITHIUM ION SECONDARY BATTERY AND LITHIUM ION SECONDARY BATTERY

(71) Applicant: TDK CORPORATION, Tokyo (JP)

(72) Inventors: Hiroshi Sasagawa, Tokyo (JP); Yasuyuki Kawanaka, Tokyo (JP); Takuya Aoki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 50 days.

(21) Appl. No.: 15/915,371

(22) Filed: Mar. 8, 2018

(65) Prior Publication Data

US 2018/0269468 A1 Sep. 20, 2018

(30) Foreign Application Priority Data

Mar. 17, 2017 (JP) .................................. 2017-052694
Jan. 22, 2018 (JP) .................................. 2018-008465

(51) Int. Cl.
| | |
|---|---|
| *H01M 4/133* | (2010.01) |
| *H01M 4/38* | (2006.01) |
| *H01M 10/0525* | (2010.01) |
| *H01M 4/587* | (2010.01) |
| *H01M 4/02* | (2006.01) |
| *H01M 10/0585* | (2010.01) |

(52) U.S. Cl.
CPC .............. *H01M 4/133* (2013.01); *H01M 4/38* (2013.01); *H01M 4/587* (2013.01); *H01M 10/0525* (2013.01); *H01M 10/0585* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 2010/0015514 A1* | 1/2010 | Miyagi | ................. | H01M 4/131 429/129 |
| 2012/0164530 A1* | 6/2012 | Temmyo | ............... | H01M 4/133 429/211 |

(Continued)

FOREIGN PATENT DOCUMENTS

| | | |
|---|---|---|
| JP | H09-320593 A | 12/1997 |
| JP | 2004-055139 A | 2/2004 |

(Continued)

*Primary Examiner* — Wyatt P McConnell
(74) *Attorney, Agent, or Firm* — Oliff PLC

(57) ABSTRACT

A negative electrode of a lithium ion secondary battery of the present invention includes a current collector (32) and a negative electrode active material layer (34) provided on the current collector (32). In the negative electrode of a lithium ion secondary battery, the negative electrode active material layer (34) includes carbon particles, a degree of graphitization of the carbon particles is 1.0 or more and 1.5 or less and a degree of orientation of the carbon particles is 50 or more and 150 or less; where, the degree of graphitization is a ratio (P101/P100) between a peak intensity P101 of the (101) plane and a peak intensity P100 of the (100) plane in an X-ray diffraction pattern and the degree of orientation is a ratio (P002/P110) between a peak intensity P002 of the (002) plane and a peak intensity P110 of the (110) plane in an X-ray diffraction pattern.

9 Claims, 1 Drawing Sheet

(56) References Cited

U.S. PATENT DOCUMENTS

| | | | |
|---|---|---|---|
| 2012/0219863 A1 | 8/2012 | Takahashi et al. | |
| 2012/0270101 A1 | 10/2012 | Higashizaki et al. | |
| 2013/0011747 A1 | 1/2013 | Sasaki et al. | |
| 2013/0130127 A1 | 5/2013 | Sotowa et al. | |
| 2013/0280601 A1* | 10/2013 | Geramita | H01M 4/133 429/204 |
| 2015/0255793 A1* | 9/2015 | Wakizaka | H01M 4/587 252/182.1 |
| 2015/0318545 A1* | 11/2015 | Satow | H01M 4/133 429/324 |
| 2016/0293941 A1* | 10/2016 | Yamasaki | H01M 4/587 |

FOREIGN PATENT DOCUMENTS

| | | |
|---|---|---|
| JP | 2011-082054 A | 4/2011 |
| JP | 2015-122340 A | 7/2015 |
| JP | 2015-181116 A | 10/2015 |
| JP | 2016-184534 A | 10/2016 |
| WO | 2011/115247 A1 | 9/2011 |
| WO | 2012/017676 A1 | 2/2012 |
| WO | 2014/103281 A1 | 7/2014 |

* cited by examiner

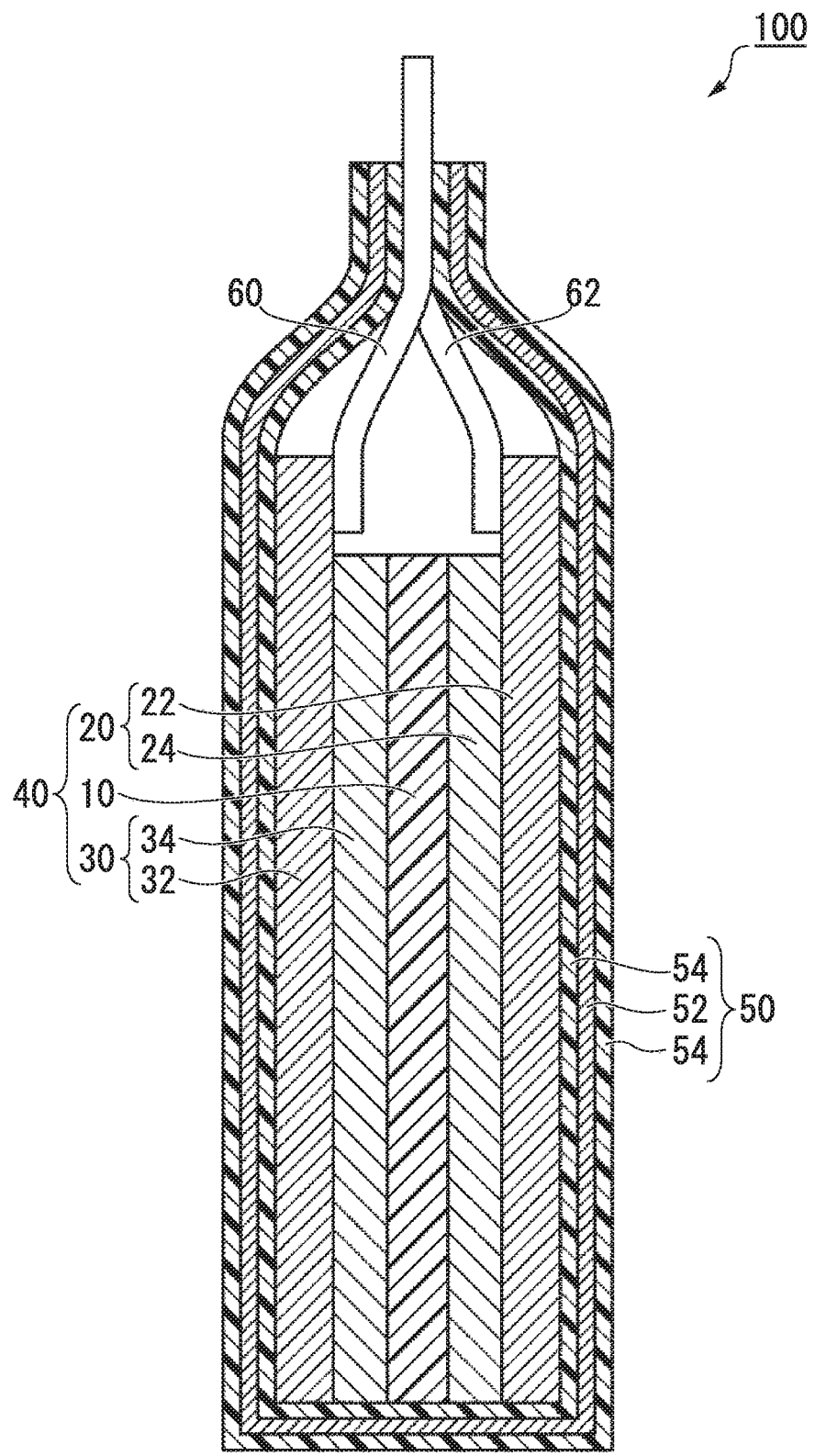

NEGATIVE ELECTRODE FOR LITHIUM ION SECONDARY BATTERY AND LITHIUM ION SECONDARY BATTERY

BACKGROUND OF THE INVENTION

Field of the Invention

The present invention relates to a negative electrode of a lithium ion secondary battery and a lithium ion secondary battery.

Priority is claimed on Japanese Patent Application No. 2017-052694, filed Mar. 22, 2017, and Japanese Patent Application No. 2018-008465, filed Jan. 22, 2018, the content of which is incorporated herein by reference.

Description of Related Art

Lithium ion secondary batteries are lighter and have a higher capacity than nickel-cadmium batteries, nickel hydride batteries, and the like, and are widely used as power sources for portable electronic devices. In addition, lithium ion secondary batteries are strong candidates for power sources for hybrid vehicles and electric vehicles. The demand for reducing the size of portable electronic devices, high functionality, and a high capacity of power sources for vehicles is increasing year after year, and a higher capacity of lithium ion batteries is expected.

Graphite is generally used as a negative electrode active material of a lithium ion secondary battery. However, a theoretical capacity of graphite is 372 mAh/g, and a capacity of about 350 mAh/g has already been used in batteries in practice. Therefore, in order to obtain a nonaqueous electrolyte secondary battery having a sufficient capacity as an energy source of a highly-functional portable device in the future, it is necessary to realize a higher capacity.

Further, in recent years, in addition to a higher capacity, the requirement for rapid charging characteristics for improving convenience and rapid charging and discharging according to the development of new applications of lithium ion secondary batteries such as electric tools and cordless home appliances has also been increasing.

When rapid charging is performed, a high current is necessary, and when a movement speed of Li ions exceeds a Li ion-acceptance performance of graphite, there are problems that Li metal precipitates on a surface of a negative electrode and the performance and safety of the lithium ion secondary battery deteriorate.

In order to solve this problem, for example, controlling a pore volume of carbon particles and an interlayer distance of graphite particles is proposed in Patent Document 1, and regulation of a density and a structure of an electrode is proposed in Patent Document 2.

PATENT DOCUMENTS

[Patent Document 1] Japanese Unexamined Patent Application, First Publication No. 2015-181116
[Patent Document 2] Japanese Unexamined Patent Application, First Publication No. 2015-122340

SUMMARY OF THE INVENTION

However, in the inventions disclosed in Patent Documents 1 and 2, sufficient input and output characteristics were not obtained.

The present invention has been made in view of the above problem, and an object of the present invention is to provide a negative electrode for a lithium secondary battery through which precipitation of Li is prevented and which has excellent input and output characteristics and a lithium ion secondary battery using the same.

In order to achieve the above object, the following aspects are provided.

(1) A negative electrode of a lithium ion secondary battery according to an aspect of the present invention includes a current collector and a negative electrode active material layer provided on the current collector, the negative electrode active material layer includes carbon particles, a degree of graphitization of the carbon particles is 1.0 or more and 1.5 or less, and a degree of orientation of the carbon particles is 50 or more and 150 or less; where, the degree of graphitization is a ratio (P101/P100) between a peak intensity P101 of the (101) plane and a peak intensity P100 of the (100) plane in an X-ray diffraction pattern, and the degree of orientation is a ratio (P002/P110) between a peak intensity P002 of the (002) plane and a peak intensity P110 of the (110) plane in an X-ray diffraction pattern.

(2) In the above aspect, a crystallite size (crystallite diameter) Lc004 of the carbon particles in a C axis direction in an X-ray diffraction pattern may be 300 Å or more and 600 Å or less.

(3) In the above aspect, an R value of the carbon particles may be 0.05 or more and 1.0 or less.

Here, the R value is a ratio $(I_D/I_G)$ between an intensity $(I_D)$ of a peak in a range of 1300 to 1400 $cm^{-1}$ and an intensity $(I_G)$ of a peak in a range of 1580 to 1620 $cm^{-1}$ measured in a Raman spectroscopy spectrum.

(4) In the above aspect, the negative electrode active material layer may have at least one peak in a range of a pore size of 0.1 μm or more and 10 μm or less in a pore size distribution curve obtained through mercury intrusion porosimetry, and a cumulative pore volume in a range of a pore size of 0.1 μm or more and 10 μm or less may be 0.06 cc/g or more.

(5) A lithium ion secondary battery according to an aspect of the present invention includes the negative electrode of a lithium ion secondary battery according to the above aspect, a positive electrode, and an electrolyte.

In the negative electrode of a lithium ion secondary battery of the present invention, precipitation of Li is prevented and the negative electrode can be used for a lithium ion secondary battery having excellent input and output characteristics.

In the lithium ion secondary battery of the present invention, precipitation of Li is prevented and input and output characteristics are excellent.

BRIEF DESCRIPTION OF THE DRAWINGS

FIGURE is a schematic cross-sectional view of a lithium ion secondary battery according to the present embodiment.

DETAILED DESCRIPTION OF THE INVENTION

The present embodiment will be appropriately described below in detail with reference to the drawings. In the drawings used in the following description, in order to facilitate understanding of features of the present invention, feature parts are enlarged for convenience of illustration in some cases, and size ratios and the like between components may be different from actual components. Materials, sizes, and the like exemplified in the following description are examples not liming the present invention, and they can be appropriately changed within a range in which effects of the present invention are obtained.

[Lithium Ion Secondary Battery]

FIGURE is a schematic cross-sectional view of a lithium ion secondary battery according to the present embodiment.

A lithium ion secondary battery 100 shown in FIGURE mainly includes a laminate 40, a case 50 in which the laminate 40 in a sealed state is housed and a pair of leads 60 and 62 connected to the laminate 40. In addition, although not shown, an electrolytic solution is housed together with the laminate 40 in the case 50.

In the laminate 40, a positive electrode 20 and a negative electrode 30 face each other with a separator 10 therebetween. In the positive electrode 20, a positive electrode active material layer 24 is provided on a plate-like (film-like) positive electrode current collector 22. In the negative electrode 30, a negative electrode active material layer 34 is provided on a plate-like (film-like) negative electrode current collector 32.

The positive electrode active material layer 24 and the negative electrode active material layer 34 are in contact with both sides of the separator 10. The leads 62 and 60 are connected to ends of the positive electrode current collector 22 and the negative electrode current collector 32, respectively, and ends of the leads 60 and 62 extend outside of the case 50. While a case in which one laminate 40 is provided in the case 50 has been exemplified in FIGURE, a plurality of laminates may be provided.

"Negative Electrode"

The negative electrode 30 includes the negative electrode current collector 32 and the negative electrode active material layer 34 provided on the negative electrode current collector 32.

(Negative Electrode Current Collector)

The negative electrode current collector 32 may be a conductive plate material. For example, a copper or nickel foil thin metal plate can be used. It is preferable that the negative electrode current collector 32 not be alloyed with lithium, and copper is particularly preferable. The thickness of the negative electrode current collector 32 is preferably 6 μm or more and 30 μm or less.

(Negative Electrode Active Material Layer)

The negative electrode active material layer 34 includes a negative electrode active material and a negative electrode binder, and includes a conductive material as necessary.

(Negative Electrode Active Material)

The negative electrode active material includes carbon particles. The carbon particles have a degree of graphitization of 1.0 or more and 1.5 or less and a degree of orientation of 50 or more and 150 or less. Here, in this specification, the degree of graphitization is a ratio (P101/P100) between a peak intensity P101 of the (101) plane and a peak intensity P100 of the (100) plane in an X-ray diffraction pattern, and the degree of orientation is a ratio (P002/P110) between a peak intensity P002 of the (002) plane and a peak intensity P110 of the (110) plane in an X-ray diffraction pattern.

In such a configuration, it is possible to obtain a negative electrode of a lithium ion secondary battery through which precipitation of Li is prevented and which has excellent input and output characteristics.

The reason for this is not necessarily clear. However, it is conceivable that, due to an interaction between an appropriate turbulent layer structure of carbon particles and Li ion insertion sites that are appropriately and randomly present, Li ion acceptability is improved.

Here, the negative electrode active material may include substances other than the carbon particles within a range in which effects of the present invention are obtained.

The degree of graphitization (P101/P100) indicates a degree of regular arrangement of hexagonal net planes of carbon, and when a value thereof is high, there are fewer turbulent layer structures and hexagonal net planes of carbon are more regularly arranged. In other words, when a value thereof increases, a proportion of hexagonal net planes of carbon that are disposed parallel to a c axis direction at equal intervals increases.

In addition, the degree of orientation (P002/P110) represents an orientation of a graphite crystal with respect to a surface of the negative electrode. When a value thereof decreases, not many hexagonal net planes of carbon are oriented with respect to a surface of the negative electrode and when a value thereof increases, hexagonal net planes of carbon are oriented in a parallel direction with respect to a surface of the negative electrode.

Here, the peak intensity P110 is derived from an ab axis direction of a graphite crystal and the peak intensity P002 is derived from a c axis direction.

In addition, a crystallite size Lc004 of carbon particles in the c axis direction in an X-ray diffraction pattern is preferably 300 Å or more and 600 Å or less.

In such a configuration, input and output characteristics are further improved. This is thought to be caused by the fact that there are more Li ion acceptance sites according to such a configuration.

In addition, an R value of carbon particles is preferably 0.05 or more and 1.0 or less.

Here, the R value is a ratio ($I_D/I_G$) between an intensity ($I_D$) of a peak in a range of 1300 to 1400 cm$^{-1}$ and an intensity ($I_G$) of a peak in a range of 1580 to 1620 cm$^{-1}$ measured in a Raman spectroscopy spectrum. A peak of $I_G$ is a peak that is caused by vibration in a hexagonal lattice of carbon atoms in a graphite structure, and a peak of $I_D$ is a peak that is caused by carbon atoms having a dangling bond of amorphous carbon or the like.

In such a configuration, input and output characteristics are further improved. This is thought to be caused by the fact that a balance between amorphous parts and graphitic parts becomes appropriate according to such a configuration.

(Negative Electrode Conductive Material)

Examples of the conductive material include a carbon powder such as carbon blacks, carbon nanotubes, carbon materials, copper, nickel, and stainless steel and iron fine metal powders, a mixture of a carbon material and a fine metal powder, and a conductive oxide such as ITO. Among them, a carbon powder such as acetylene black and ethylene black is particularly preferable. When sufficient conductivity can be ensured using only the negative electrode active material, the lithium ion secondary battery 100 may not include a conductive material.

(Negative Electrode Binder)

The binder binds active material together and binds the active material to the negative electrode current collector 32. The binder can be any material as long as it is capable of the above binding, for example, fluorine resins such as polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF).

Further, in addition to the above examples, as the binder, for example, vinylidene fluoride type fluorine rubbers such as a vinylidene fluoride-hexafluoropropylene type fluorine rubber (VDF-HFP type fluorine rubber), a vinylidene fluoride-hexafluoropropylene-tetrafluoroethylene type fluorine rubber (VDF-HFP-TFE type fluorine rubber), a vinylidene fluoride-pentafluoropropylene type fluorine rubber (VDF-PFP type fluorine rubber), a vinylidene fluoride-pentafluoropropylene-tetrafluoroethylene type fluorine rubber (VDF-PFP-TFE type fluorine rubber), a vinylidene fluoride-perfluoromethyl vinyl ether-tetrafluoroethylene type fluorine rubber (VDF-PFMVE-TFE type fluorine rubber), and a vinylidene fluoride-chlorotrifluoroethylene type fluorine rubber (VDF-CTFE type fluorine rubber) may be used.

In addition, as the binder, a conductive polymer having electron conductivity and a conductive polymer having ion conductivity may be used. As a conductive polymer having electron conductivity, for example, polyacetylene, may be exemplified. In this case, since the binder also functions as a conductive material, no conductive material may be added. As a conductive polymer having ion conductivity, for example, a polymer having conductivity from ions such as lithium ions can be used, for example, a composite of a monomer for a polymer compound (a polyether polymer compound such as polyethylene oxide and polypropylene oxide, polyphosphazene, or the like) and a lithium salt such as $LiClO_4$, $LiBF_4$, $LiPF_6$ or an alkali metal salt that contains mainly lithium can be used. Examples of a polymerization initiator used for combining include a photopolymerization initiator, a thermal polymerization initiator, and the like compatible with the above monomer.

Further, in addition thereto, as the binder, for example, cellulose, a styrene-butadiene rubber, an ethylene-propylene rubber, a polyimide resin, a polyimide imide resin, or an acrylic resin may be used.

The negative electrode active material layer preferably has at least one peak in a range of a pore size of 0.1 μm or more and 10 μm or less in a pore size distribution curve obtained through mercury intrusion porosimetry and a cumulative pore volume in a range of a pore size of 0.1 μm or more and 10 μm or less is 0.06 cc/g or more. In addition, a cumulative pore volume is preferably 0.15 cc/g or less in a range of a pore size of 0.1 μm or more and 10 μm or less.

Here, the cumulative pore volume refers to a total pore volume obtained by summing pore volumes in a predetermined pore size range in a pore size distribution curve or a pore size distribution graph with a horizontal axis that represents a pore size (μm) and a vertical axis that represents a pore volume (cc/g).

In such a configuration, input and output characteristics are further improved. This is thought to be caused by the fact that there are more pores into which Li ions diffuse in the negative electrode and Li ion acceptability is improved according to such a configuration.

Contents of the negative electrode active material, the conductive material, and the binder in the negative electrode active material layer 34 are not particularly limited. A constituent proportion of the negative electrode active material in the negative electrode active material layer 34 is preferably 80% or more and 99% or less and more preferably 90% or more and 98% or less according to percentage by mass. In addition, a constituent proportion of the conductive material in the negative electrode active material layer 34 is preferably 0% or more and 20% or less according to percentage by mass, and a constituent proportion of the binder in the negative electrode active material layer 34 is preferably 1% or more and 10% or less according to percentage by mass.

When the contents of the negative electrode active material and the binder are set in the above ranges, it is possible to prevent a strong negative electrode active material layer from not being formed due to too small an amount of binder. In addition, it is also possible to prevent a tendency in which an amount of binder that does not contribute to an electric capacity increases and it is difficult to obtain a sufficient volume energy density.

"Positive Electrode"

The positive electrode 20 includes the positive electrode current collector 22 and the positive electrode active material layer 24 provided on the positive electrode current collector 22.

(Positive Electrode Current Collector)

The positive electrode current collector 22 may be a conductive plate material. For example, an aluminum, copper, or nickel foil thin metal plate can be used.

(Positive Electrode Active Material Layer)

As the positive electrode active material used in the positive electrode active material layer 24, an electrode active material that can reversibly cause occlusion and release of lithium ions, desorption and insertion (intercalation) of lithium ions, or doping and de-doping of lithium ions and counter anions (for example, $PF_6^-$) of lithium ions can be used.

For example, lithium cobaltate ($LiCoO_2$), lithium nickelate ($LiNiO_2$), lithium manganite ($LiMnO_2$), lithium manganese spinel ($LiMn_2O_4$), a composite metal oxide represented by a general formula: $LiNi_xCo_yMn_zM_{a2}$ (x+y+z+a=1, 0≤x<1, 0≤y<1, 0≤z<1, 0≤a<1, M denotes at least one element selected from among Al, Mg, Nb, Ti, Cu, Zn, and Cr), a lithium vanadium compound ($LiV_2O_5$), olivine type $LiMPO_4$ (here, M denotes at least one element selected from among Co, Ni, Mn, Fe, Mg, Nb, Ti, Al, and Zr or VO), a composite metal oxide such as lithium titanate ($Li_4Ti_5O_{12}$) and $LiNi_xCo_yAl_zO_2$ (0.9<x+y+z<1.1), polyacetylene, polyaniline, polypyrrole, polythiophene, and polyacene may be exemplified.

(Positive Electrode Conductive Material)

Examples of the conductive material include a carbon powder such as carbon blacks, carbon nanotubes, carbon materials, copper, nickel, stainless steel, and iron metal fine powders, a mixture of a carbon material and a fine metal powder, and a conductive oxide such as ITO. Among them, a carbon material such as carbon black is preferable. When sufficient conductivity can be ensured using only the positive electrode active material, the lithium ion secondary battery 100 may not include a conductive material.

(Positive Electrode Binder)

The same binder as in the negative electrode can be used for the positive electrode.

A constituent proportion of the positive electrode active material in the positive electrode active material layer 24 is preferably 80% or more and 90% or less according to percentage by mass. In addition, a constituent proportion of the conductive material in the positive electrode active material layer 24 is preferably 0.5% or more and 10% or less according to percentage by mass, and a constituent proportion of the binder in the positive electrode active material layer 24 is preferably 0.5% or more and 10% or less according to percentage by mass.

"Separator"

The separator 10 may be formed of an electrically insulating porous structure. For example, a single layer film made of polyethylene, polypropylene or polyolefin, a laminate, a stretched film of a mixture of the above resins, or a fiber nonwoven fabric made of at least one constituent material selected from the group consisting of cellulose, polyester, and polypropylene may be used.

"Electrolytic Solution"

As the electrolytic solution, an electrolyte solution (an aqueous electrolyte solution, and an electrolyte solution in which an organic solvent is used) containing a lithium salt can be used. However, since an aqueous electrolyte solution has an electrochemically low decomposition voltage, a tolerable voltage during charging is restricted to being low. Therefore, an electrolyte solution (nonaqueous electrolyte solution) in which an organic solvent is used is preferable.

The nonaqueous electrolytic solution is obtained by dissolving an electrolyte in a nonaqueous solvent and a cyclic carbonate and a chain carbonate may be contained as the nonaqueous solvent.

As a cyclic carbonate, a cyclic carbonate that can dissolve an electrolyte can be used. For example, ethylene carbonate, propylene carbonate, and butylene carbonate can be used.

The chain carbonate can lower a viscosity of a cyclic carbonate. For example, diethyl carbonate, dimethyl carbonate, and ethyl methyl carbonate may be exemplified. In addition, methyl acetate, ethyl acetate, methyl propionate, ethyl propionate, γ-butyrolactone, 1,2-dimethoxyethane, and 1,2-diethoxyethane may be mixed in and used.

A ratio between the cyclic carbonate and the chain carbonate in the nonaqueous solvent is preferably 1:9 to 1:1 by volume.

As the electrolyte, lithium salts, for example, $LiPF_6$, $LiClO_4$, $LiBF_4$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB can be used. Here, these lithium salts may be used alone or two or more types thereof may be used in combination. In particular, in consideration of a degree of ionization, $LiPF_6$ is preferably included.

When $LiPF_6$ is dissolved in a nonaqueous solvent, a concentration of the electrolyte in the nonaqueous electrolytic solution is preferably adjusted to 0.5 to 2.0 mol/L. When a concentration of the electrolyte is 0.5 mol/L or more, a sufficient concentration of lithium ions in the nonaqueous electrolytic solution can be ensured and a sufficient capacity can be easily obtained during charging and discharging. In addition, when a concentration of the electrolyte is limited to 2.0 mol/L or less, an increase in viscosity of the nonaqueous electrolytic solution is prevented and sufficient mobility of lithium ions can be ensured, and a sufficient capacity can be easily obtained during charging and discharging.

Even if $LiPF_6$ is mixed with other electrolytes, a concentration of lithium ions in the nonaqueous electrolytic solution is preferably adjusted to 0.5 to 2.0 mol/L, and a concentration of lithium ions from $LiPF_6$ is more preferably 50 mol % or more.

"Case"

The laminate 40 and the electrolytic solution are sealed in the case 50. The case 50 is not particularly limited as long as it can prevent the electrolytic solution from leaking outside and entering of moisture and the like from outside into the lithium ion secondary battery 100.

For example, as the case 50, as shown in FIGURE, a metal laminate film in which a metal foil 52 is coated with polymer films 54 on both sides can be used. For example, an aluminum foil can be used as the metal foil 52, and a polypropylene film or the like can be used as the polymer film 54. For example, as a material of the outer polymer film 54, polymers having a high melting point, for example, polyethylene terephthalate (PET) and polyamide, are preferable. As a material of the inner polymer film 54, polyethylene (PE), polypropylene (PP), and the like are preferable.

"Leads"

The leads 60 and 62 are made of a conductive material such as aluminum. Thus, when the leads 60 and 62 are welded to the positive electrode current collector 22 and the negative electrode current collector 32, respectively, according to a known method, and the separator 10 is interposed between the positive electrode active material layer 24 of the positive electrode 20 and the negative electrode active material layer 34 of the negative electrode 30, they are inserted into the case 50 together with the electrolytic solution and an opening of the case 50 is sealed.

"Method of Producing Negative Electrode"

A method of producing a negative electrode of the present invention includes a crystal strain imparting process, a re-graphitization process, and a degree of orientation adjusting process. In addition, an R value adjusting process and a cumulative pore volume adjusting process may be performed. Other processes may be included as long as it is possible to produce a negative electrode within a range in which effects of the present invention are obtained.

The crystal strain imparting process is a process in which, after natural graphite or artificial graphite is pulverized and classified, a mechanochemical treatment and the like are performed so that distortion and a turbulent layer are introduced into a crystal structure of the pulverized graphite particles.

In addition, the re-graphitization process is a process in which the particles that have undergone the crystal strain imparting process are annealed and re-graphitized in a temperature range of 2400° C. to 3200° C., and thus a degree of graphitization is adjusted. That is, the degree of graphitization is adjusted by adjusting conditions of two processes, the crystal strain imparting process and the re-graphitization process. The crystal strain imparting process and the re-graphitization process may be collectively referred to as a degree of graphitization adjusting process.

In addition, in the degree of orientation adjusting process, a negative electrode active material layer including the carbon particles whose degree of graphitization is adjusted in the crystal strain imparting process and the re-graphitization process is formed on the current collector, and then pressurized so that a degree of orientation of a graphite crystal in the negative electrode active material layer is adjusted.

A mechanism of adjusting a degree of graphitization is speculated to be as follows.

For the particles into which a crystal strain and a turbulent layer are introduced in the crystal strain imparting process, in the re-graphitization process, the particles are annealed and re-graphitized at 2400° C. to 3200° C. However, at this time, generally, graphitization proceeds faster in crystallites on the surface of the particles than crystallites inside the particles. Accordingly, crystallites arranged on the surface of the particles impart a spatial restriction on the growth of crystallites inside the particles. If crystallites freely grow, hexagonal net planes of carbon are disposed parallel to a c axis direction at equal intervals. However, if there is a spatial restriction, the regularity of stacking hexagonal net planes of carbon is accordingly disturbed. Thus, a degree of disturbance, that is, a degree of graphitization, depends on conditions of the crystal strain imparting process and conditions of the re-graphitization process. That is, according to a combination of conditions of the crystal strain imparting process and conditions of the re-graphitization process, it is possible to adjust a degree of graphitization. In this specification, when it is described that conditions of the degree of graphitization adjusting process are adjusted, this means that a combination of conditions of the crystal strain imparting process and conditions of the re-graphitization process are adjusted.

(Pulverization Process)

In the pulverization process, natural graphite or artificial graphite is pulverized.

The pulverization process is preferably performed in order to refine graphite and control a crystallite diameter.

In the pulverization process, a commonly used pulverization device can be used. For example, a vibration ball mill, an ultra fine mill, and a jet mill can be used. The pulverization process may be performed after or before the graphitization.

(Classification Process)

The pulverized particles are classified. The classification can be performed using an air classifier or the like. Alternatively, the classification may be performed using a sieve.

(Crystal Strain Imparting Process)

In the crystal strain imparting process, a mechanochemical treatment and the like are performed so that distortion and a turbulent layer are introduced into a crystal structure of the pulverized graphite particles. In the mechanochemical treatment, compressive stress and shear stress are imparted to particles, and collision, friction, unaligned stress, and the like are imparted thereto in addition to compressive stress and shear stress. Due to a mechanical energy of such stresses, an effect called a mechanochemical phenomenon is exhibited. In order for the mechanochemical phenomenon to be exhibited in particles, a device capable of simultaneously applying stresses such as shearing, compression, and collision may be used, and a structure and a principle of a device are not particularly limited. For example, a ball type kneading machine such as a rotary type ball mill, a Mechanofusion (manufactured by Hosokawa Micron Co. Ltd.), and a Nobiluta (manufactured by Hosokawa Micron Co. Ltd.) may be used.

The crystal strain imparting process can be performed using, for example, a Mechanofusion (manufactured by Hosokawa Micron Co. Ltd.). Impartment of a crystal strain is adjusted according to an amount of work (kW·h) represented by a product of a load (kW) applied to a rotary rotor and a treatment time (h) therefor. The inventors have conducted extensive studies and as a result, found that there is a correlation between an amount of work and a degree of graphitization. Based on such findings, it was found that a degree of graphitization can be adjusted in the crystal strain imparting process and the re-graphitization process.

Here, a Mechanofusion (manufactured by Hosokawa Micron Co. Ltd.) has a configuration in which a rotary rotor and a press head are provided in a cylindrical chamber and the rotary rotor rotates at a high speed. A powder material is pressed between the press head and the rotor provided in the chamber and a shear force is applied, and pulverization, granulation, and surface modification are performed. Treatment conditions include a rotational speed of the rotary rotor, a load applied to the rotary rotor, a treatment time, an amount of powder filled in, and the like. When such conditions are changed, treatment results can be changed. The inventors have conducted extensive studies and as a result, found that an energy applied to the powder material is changed mainly according to a load applied to the rotary rotor and a treatment time therefor, a degree of a turbulent layer and crystal strain is accordingly changed, and a degree of graphitization can be adjusted. Hereinafter, the amount of work (kW·h) represented by a product of a load (kW) applied to a rotary rotor and a treatment time (h) therefor may be referred to as a powder treatment condition. When the powder treatment condition increases, a degree of graphitization begins to decrease. Here, a load applied to the rotary rotor can be adjusted by a rotational speed of the rotary rotor, a filling rate of a graphite raw material, and the like.

(Re-Graphitization Process)

In the crystal strain imparting process, a raw material used in the re-graphitization process is pretreated for adjusting a degree of graphitization. Therefore, in the re-graphitization process, when an annealing temperature condition in the ordinary graphitization process is simply adjusted, carbon particles whose degree of graphitization is adjusted are obtained using the graphitization raw material. Here, "carbon particles whose degree of graphitization is adjusted" may be close to graphite particles when a degree of graphitization is high and in this specification, this also includes a case in which a degree of graphitization is not high.

Annealing in the re-graphitization process refers to a treatment in which a crystal structure disturbed due to the pulverization and powder treatment returns to being close to a graphite structure. When the annealing temperature increases, a degree of graphitization begins to increase. Here, an annealing time is thought to have little influence on the degree of graphitization. This is because it takes a long time for heating and cooling when the temperature approaches about 3000° C. so that an influence of the temperature itself is greater than an influence of time.

(R Value Adjusting Process)

An R value of carbon particles can be adjusted by performing a treatment on a surface. This is because the R value is thought to be an index indicating a crystal development state on a surface of the graphite material. Generally, a larger R value indicates that crystals are undeveloped. Therefore, as the R value adjusting process, for example, a process in which an organic compound layer is formed on a surface of carbon particles and the organic compound layer is heated is performed. According to conditions (mainly an amount of an organic compound and a heat treatment temperature) of the process, the R value is adjusted. In order to form the organic compound layer on the surface of carbon particles, spraying by a method, such as for example, spray drying, can be performed.

As the organic compound, at least one selected from the group consisting of petroleum pitch-based, coal pitch-based, a phenol resin, a polyvinyl alcohol resin, a furan resin, a cellulose resin, a polystyrene resin, a polyimide resin, an epoxy resin and an organic acid compound can be used.

In addition, a heat treatment temperature of the organic compound is preferably 200° C. or more and 2000° C. or less, more preferably 400° C. or more and 1500° C. or less, and most preferably 500° C. or more and 1200° C. or less. When the heat treatment temperature is too low, carbonization of the organic compound is not sufficiently completed and hydrogen and oxygen may remain. Hydrogen and oxygen remaining in the negative electrode active material may adversely influence battery characteristics. On the other hand, when the heat treatment temperature is too high, too much crystallization proceeds and a degree of graphitization may not be within a predetermined range. When crystallization of a surface-treated part proceeds, there is a risk of charging characteristics deteriorating.

(Degree of Orientation Adjusting Process)

In the negative electrode of the lithium ion secondary battery, in order to increase a capacity density, an active material applied to the current collector is pressed and thus a high density is obtained. However, in the degree of orientation adjusting process, adjustment is performed such that graphite particles are deformed and crystallites are oriented in graphite particles in a direction parallel to the current collector according to a pressing pressure.

(Cumulative Pore Volume Adjusting Process)

As the cumulative pore volume adjusting process, for example, a particle size distribution of carbon particles can be adjusted.

In order to adjust a particle size distribution, for example, an air flow type classifier is used. Fine powder and coarse particles can be cut off in an arbitrary range and the particle size distribution can be adjusted. For example, when not much fine powder and coarse particles are cut off, the particle size distribution becomes broad, and when much fine powder and coarse particles are cut off, the particle size distribution becomes narrow. When the particle size distribution becomes broad, a cumulative pore volume of the negative electrode active material layer tends to decrease and when the particle size distribution becomes narrow, a cumulative pore volume of the negative electrode active material layer tends to increase.

(Measurement of Degree of Graphitization, and Crystallite Size (Crystallite Diameter) in C Axis Direction)

A degree of graphitization of carbon particles whose degree of graphitization is adjusted in the degree of graphitization adjusting process can be obtained as a ratio (P101/P100) between a peak intensity P101 of the (101) plane and a peak intensity P100 of the (100) plane in an X-ray diffraction pattern using an X-ray diffraction method.

In addition, the crystallite size Lc004 in the C axis direction can be calculated based on a width at half height of a peak of the (004) plane in an X-ray diffraction pattern using the X-ray diffraction method.

The negative electrode active material layer is formed on the negative electrode current collector, X-ray diffraction is then performed, and a peak intensity P101 attributed to the (101) plane of carbon particles and a peak intensity P100 attributed to the (100) plane are obtained, and a ratio therebetween can be obtained as a degree of graphitization. In addition, the crystallite size Lc004 in the C axis direction can be calculated based on a peak attributed to the (004) plane of carbon particles when the negative electrode active material layer is formed on the negative electrode current collector and X-ray diffraction is then performed.

(Measurement of R Value)

The R value can be obtained from a D band peak intensity ($I_D$) and a G band peak intensity ($I_G$) measured using, for example, a commercially available Raman spectrometer.

(Measurement of Degree of Orientation)

A degree of orientation of carbon particles whose degree of orientation is adjusted in the degree of orientation adjusting process can be obtained as a ratio (P101/P100) between a peak intensity P101 of the (101) plane and a peak intensity P100 of the (100) plane in an X-ray diffraction pattern using the X-ray diffraction method.

The degree of orientation is obtained when the negative electrode active material layer is formed on the negative electrode current collector and X-ray diffraction is then performed.

[Method of Producing Lithium Ion Secondary Battery]

Next, a method of producing the lithium ion secondary battery 100 will be described in detail from a step of preparing a negative electrode using a negative electrode active material (carbon particles whose degree of graphitization is adjusted) obtained by performing the degree of graphitization adjusting process.

The obtained negative electrode active material, a binder and a solvent are mixed to prepare a paint. A conductive material may be further added as necessary. As the solvent, for example, water, N-methyl-2-pyrrolidone, or N,N-dimethylformamide can be used. A component ratio between the negative electrode active material, the conductive material, and the binder is preferably 80 wt % to 90 wt %:0.1 wt % to 10 wt %:0.1 wt % to 10 wt % according to percentage by mass. Such a mass ratio is adjusted so that the total proportion is 100 wt %.

A method of mixing such components constituting a paint is not particularly limited, and a mixing order is not particularly limited. The above paint is applied to the negative electrode current collector 32. An application method is not particularly limited, and a method used when a common electrode is prepared can be used. For example, a slit die coating method and a doctor blade method may be exemplified. In the same manner, for the positive electrode, a paint for a positive electrode is applied to the positive electrode current collector 22.

Subsequently, the solvent in the paint applied to the positive electrode current collector 22 and the negative electrode current collector 32 is removed. A removal method is not particularly limited. For example, the positive electrode current collector 22 and the negative electrode current collector 32 coated with the paint may be dried under an atmosphere of 80° C. to 150° C.

Then, while the positive electrode active material layer 24 is formed on the positive electrode current collector 22 in this manner, a press treatment is performed using a roll press device or the like and thus a positive electrode is prepared.

On the other hand, while the negative electrode active material layer 34 is formed on the negative electrode current collector 32, a press treatment is performed so that a degree of orientation is 50 to 150, and thus a negative electrode is prepared.

Next, the positive electrode 20 including the positive electrode active material layer 24, the negative electrode 30 including the negative electrode active material layer 34, the separator 10 interposed between the positive electrode and the negative electrode, and the electrolytic solution are sealed in the case 50.

For example, the positive electrode 20, the negative electrode 30, and the separator 10 are laminated, the positive electrode 20 and the negative electrode 30 are heated and pressed using a press instrument in a direction perpendicular to a lamination direction, and the positive electrode 20, the separator 10, and the negative electrode 30 are brought into close contact with each other. Then, for example, the laminate 40 is put into the bag-like case 50 prepared in advance.

Finally, the electrolytic solution is injected into the case 50 and thus a lithium ion secondary battery is prepared. Here, instead of injecting the electrolytic solution into the case, the laminate 40 may be impregnated into the electrolytic solution.

The embodiments of the present invention have been described in detail above with reference to the drawings, but configurations and combinations thereof in the embodiments are only examples, and additions, omissions, substitutions and other modifications of the configurations can be made without departing from the scope of the present invention

EXAMPLES

Example 1

A commercially available artificial graphite was used as a raw material, and the raw material was pulverized using a planetary ball mill (model PM200 manufactured by Retsch Co. Ltd.) at a rotational speed of 500 rpm of the planetary ball mill. Then, a particle size distribution was adjusted using an air classifier, and D10, D50, and D90 were set to 2 μm, 18 μm, and 42 μm in that order. Here, D10, D50, and D90 were a particle size (particle diameter) at an accumulation of 10%, a particle size at an accumulation of 50%, and a particle size at an accumulation of 90%, respectively, in a particle size distribution curve with a horizontal axis that represents a particle size and a vertical axis that represents cumulative %.

Next, a mechanochemical treatment was performed on the obtained pulverized raw material using a Mechanofusion (manufactured by Hosokawa Micron Co. Ltd.). That is, three forces: compressive stress, shear stress, and impact, were applied. In this case, a load applied to the rotary rotor was 3 kW, a treatment time therefor was 1 hour (h), and an amount of work thereof (powder treatment condition) was 3 kW·h.

Next, the raw material pretreated using Mechanofusion was filled into a graphite container, and heated and graphitized at an annealing temperature of 2400° C. using an Acheson furnace, and "carbon particles whose degree of graphitization was adjusted" were prepared.

Then, the obtained negative electrode active material, acetylene black prepared as a conductive material, and polyvinylidene fluoride (PVdF) prepared as a binder were mixed to prepare a negative electrode mixture. The mass ratio between the negative electrode active material, the conductive material, and the binder was 94:2:4. The negative electrode mixture was dispersed in N-methyl-2-pyrrolidone to prepare a negative electrode mixture paint. Then, the paint was applied at a coating amount of 6.1 mg/cm$^2$ to one surface of an electric field copper foil with a thickness of 10 μm. After the application, drying was performed at 100° C., the solvent was removed, and a negative electrode active material layer was formed. Then, a degree of orientation of the negative electrode active material layer was adjusted using a calender press machine with a calender line pressure of 300 kg/cm, and thus a negative electrode according to Example 1 was prepared.

(Preparation of Lithium Ion Secondary Battery (Half Cell) for Evaluation)

The prepared negative electrode and a copper foil to which a Li foil was attached (hereinafter referred to as a Li electrode) were alternately made to face each other with a polypropylene separator with a thickness of 16 μm therebetween to prepare a laminate. Further, a nickel negative electrode lead was attached to a protruding end of a copper foil on the side on which no negative electrode active material layer was provided in the negative electrode of the laminate. In the Li electrode of the laminate, a nickel Li electrode lead was attached to a protruding end of the copper foil on the side on which no Li foil was provided by an ultrasonic welding machine.

Then, the laminate was inserted into an exterior body of an aluminum laminate film and thermally sealed except for one part around the periphery to form a closing part. A solvent in which EC, EMC, and DEC were mixed at a volume ratio of 3:5:2 and a nonaqueous electrolytic solution to which 1.5 M (mol/L) LiPF$_6$ as a lithium salt was added were injected into the exterior body. Then, the remaining one part was sealed by thermal sealing while reducing a pressure using a vacuum sealing machine, and a lithium ion secondary battery (half cell) according to Example 1 was prepared.

(Preparation of Lithium Ion Secondary Battery (Full Cell) for Evaluation)

First, a weight per unit area of a positive electrode was calculated and battery design was performed so that a ratio between a product of a negative electrode active material capacity calculated according to measurement of a negative electrode active material capacity and a weight per unit area and a product of a positive electrode active material capacity and a weight per unit area satisfied the following Relational Formula (2).

(Negative electrode active material capacity×weight per unit area)/(positive electrode active material capacity×weight per unit area)=1.1    (2)

LiCoO$_2$ prepared as a positive electrode active material, acetylene black prepared as a conductive material, and polyvinylidene fluoride (PVdF) prepared as a binder were mixed to prepare a positive electrode mixture. A mass ratio between the positive electrode active material, the conductive material, and the binder was 90:5:5. The positive electrode mixture was dispersed in N-methyl-2-pyrrolidone to prepare a positive electrode mixture paint. Then, the paint was applied to one surface of an aluminum foil with a thickness of 20 μm to obtain the calculated weight per unit area of the positive electrode. After the application, drying was performed at 100° C., the solvent was removed, and a positive electrode active material layer was formed. Then, the positive electrode active material layer was pressed and molded by roll pressing and a positive electrode according to Example 1 was prepared.

The prepared negative electrode and the positive electrode were alternately laminated with a polypropylene separator with a thickness of 16 μm therebetween, and three negative electrodes and two positive electrodes were laminated to prepare a laminate. Further, a nickel negative electrode lead was attached to a protruding end of a copper foil on the side on which no negative electrode active material layer was provided in the negative electrode of the laminate. In addition, an aluminum positive electrode lead was attached to a protruding end of an aluminum foil on the side on which no positive electrode active material layer was provided in the positive electrode of the laminate using an ultrasonic welding machine.

Then, the laminate was inserted into an exterior body of an aluminum laminate film and thermally sealed except for one part around the periphery to form a closing part. A solvent in which EC, EMC, and DEC were mixed at a volume ratio of 3:5:2 and a nonaqueous electrolytic solution in which 1.5 M (mol/L) LiPF$_6$ as a lithium salt was added were injected into the exterior body. Then, the remaining one part was sealed by thermal sealing while reducing a pressure using a vacuum sealing machine, and a lithium ion secondary battery (full cell) according to Example 1 was prepared.

Examples 2 to 9 and Comparative Examples 1 to 5

A rotational speed of a planetary ball mill (BM) in the pulverization process, a load applied to the rotary rotor in the crystal strain imparting process, a treatment time therefor and an amount of work thereof (powder treatment condition), an annealing temperature in the re-graphitization process, a calender line pressure in the degree of orientation adjusting process, and a particle size distribution (particle sizes of D10, D50, and D90) were changed as shown in Table 1 and Table 2 and thus negative electrodes of Examples 2 to 9 and Comparative Examples 1 to 5 were obtained. Using the obtained negative electrode, a lithium ion secondary battery was obtained in the same manner as in Example 1.

Rapid charging and discharging characteristics of the lithium ion secondary batteries (full cells) prepared in Examples 1 to 9 and Comparative Examples 1 to 5 were measured and it was evaluated whether Li had precipitated on the negative electrodes of the lithium ion secondary batteries (half cells) prepared in Examples 1 to 9 and Comparative Examples 1 to 5. The results are shown in Table 1 and Table 2.

Examples 10 to 17

In Example 10, a 0.1% sodium carboxymethyl cellulose (CMC) solution was sprayed onto carbon particles obtained under the same conditions as in Example 9 so that an adhesion amount thereof was 4% with respect to the weight of the carbon particles. Next, a negative electrode was obtained under the same conditions as in Example 9 except that carbon particles obtained by heating carbon particles to which CMC was adhered at 1000° C. in an inert atmosphere (surface-treated carbon particles) were used.

Examples 11 to 17 differed from Example 10 only in that adhesion amounts of a 0.1% CMC solution with respect to the weight of carbon particles were different.

Examples 18 to 20

In Example 18, in a particle size distribution (particle sizes of D10, D50, and D90) of carbon particles obtained under the same conditions as in Example 9, particle sizes of D10, D50, and D90 were adjusted to 4 µm, 17 µm, and 32 µm using an air flow type classifier.

Examples 19 and 20 differed from Example 18 only in adjustment of the particle size distribution.

Examples 21 to 24

In Examples 21 to 24, a crystallite diameter was adjusted by changing planetary BM pulverization conditions among conditions for the carbon particles used in Example 4. In the examples, parameters of a degree of graphitization and a degree of orientation were fixed and a crystallite diameter was changed.

In Example 25, a 0.1% sodium carboxymethyl cellulose (CMC) solution was sprayed onto the carbon particles obtained in Example 6 so that an adhesion amount thereof was 8% with respect to the weight of the carbon particles. Next, a negative electrode was obtained under the same conditions as in Example 6 except that carbon particles obtained by heating carbon particles to which CMC was adhered at 1000° C. in an inert atmosphere (surface-treated carbon particles) were obtained and a classification treatment was performed.

(Measurement of Negative Electrode Active Material Capacity)

The negative electrode active material capacity was measured using a secondary battery charging and discharging test device. A voltage range was changed from 5 mV to 1.5 V, 1 C=340 mAh/g (per unit weight of the negative electrode active material) was set, and constant current and constant voltage charging was performed at 0.1 C charging. Then, constant current discharging was performed at 0.1 C discharging. In the lithium ion secondary batteries (half cells) prepared in Examples 1 to 9 and Comparative Examples 1 to 5, a negative electrode active material capacity (mAh/g) per unit weight was measured under the above conditions.

Here, 1 C is a current value at which charging or discharging of a battery cell having a capacity of a nominal capacity value is completed in exactly in one hour when charged at a constant current or discharged at a constant current.

(Measurement of Rapid Charging Characteristics)

Rapid charging characteristics of the prepared lithium ion secondary batteries (full cells) were measured using a secondary battery charging and discharging test device. A voltage range was changed from 3.0 V to 4.2 V, 1 C=355 mAh (per full cell design capacity) was set, and a 3 C capacity retention ratio (%) was evaluated. Here, the 3 C capacity retention ratio is a ratio based on a 0.2 C charging capacity at a constant current and constant voltage of a charging capacity during 3 C constant current charging to a charging capacity during 0.2 C charging and is represented by the following Formula (1).

$$3\ C\ \text{capacity retention ratio (\%)} = (\text{charging capacity during 3 C constant current charging})/(\text{constant current and constant voltage charging capacity during 0.2 C charging}) \times 100 \quad (1)$$

A higher capacity retention ratio indicates more favorable rapid charging characteristics. The lithium ion secondary batteries (full cells) prepared in Examples 1 to 9 and Comparative Examples 1 to 5 were subjected to a rapid charging test under the above conditions and rapid charging characteristics were evaluated.

(Evaluation of Precipitation of Lithium on Negative Electrode)

The prepared lithium ion secondary batteries (half cells) were charged at a charging rate of 1.5 C. Then, the batteries were allowed to decompose under an environment of 5° C., and it was visually checked whether lithium had precipitated.

(Measurement of Degree of Graphitization, Degree of Orientation, and Crystallite Size in C Axis Direction)

The degree of graphitization, the degree of orientation, and the crystallite size were obtained from an X-ray diffraction pattern obtained using an X-ray diffractometer (model Ultima IV manufactured by RIGAKU, X-ray source: CuKα). That is, the degree of graphitization was obtained as a ratio (P101/P100) between a peak intensity P101 of the (101) plane and a peak intensity P100 of the (100) plane in an X-ray diffraction pattern. The degree of orientation was obtained as a ratio (P002/P110) between a peak intensity P002 of the (002) plane and a peak intensity P110 of the (110) plane in an X-ray diffraction pattern. The crystallite size Lc004 in the C axis direction was calculated based on a width at half height of a peak of the (004) plane in an X-ray diffraction pattern.

Here, when the degree of orientation was evaluated, a peak intensity of the (004) plane could be used in place of a peak intensity of the (002) plane. However, because the peak intensity of the (004) plane was weaker than the peak intensity of the (002) plane, the results varied. The inventors completed the present invention using the peak intensity of the (002) plane in place of the peak intensity of the (004) plane.

(Measurement of R Value)

An NRS-7100 (manufactured by JASCO Co. Ltd.) was used as a Raman spectrometer, an argon laser with a wavelength of 532 nm was used, an emission intensity was adjusted to become 1 mW or less using a dimmer, a Raman scattering spectrum at an excitation wavelength of 532 nm was measured and an R value was obtained.

(Measurement of Cumulative Pore Volume)

A pore distribution of the prepared negative electrode active material layer was measured through mercury intrusion porosimetry using a mercury porosimeter, and a pore size distribution curve with a horizontal axis that represents a pore size (m) and a vertical axis that represents a pore volume (cc/g) was obtained. From the obtained pore size distribution curve, it was confirmed that there was at least one peak in a range of a pore size of 0.1 μm or more and 10 μm or less and that a cumulative pore volume in a range of a pore size of 0.1 μm or more and 10 μm or less was obtained.

TABLE 1

| | Planetary BM pulverization (rpm) | Load applied to rotary rotor (kW) | Treatment time (h) | Powder treatment condition (kW – h) | Annealing temperature (° C.) | Calender line pressure (kg/cm) | D10 | D50 | D90 | Amount of organic component | Heat treatment temperature |
|---|---|---|---|---|---|---|---|---|---|---|---|
| Example 1 | 500 | 3 | 1 | 3 | 2400 | 300 | 2 | 18 | 42 | Without organic component | None |
| Example 2 | 500 | 2.3 | 1 | 2.3 | 2500 | 400 | 2 | 18 | 42 | Without organic component | None |
| Example 3 | 500 | 2.1 | 1 | 2.1 | 2500 | 400 | 2 | 18 | 42 | Without organic component | None |
| Example 4 | 400 | 2 | 1 | 2 | 2700 | 400 | 3 | 19 | 43 | Without organic component | None |
| Example 5 | 400 | 1.9 | 1 | 1.9 | 2700 | 400 | 3 | 19 | 43 | Without organic component | None |
| Example 6 | 300 | 2.5 | 0.5 | 1.25 | 3000 | 500 | 3 | 20 | 44 | Without organic component | None |
| Example 7 | 300 | 2.2 | 0.5 | 1.1 | 3000 | 600 | 3 | 20 | 44 | Without organic component | None |
| Example 8 | 300 | 1.5 | 0.5 | 0.75 | 3200 | 600 | 3 | 20 | 44 | Without organic component | None |
| Example 9 | 250 | 1.2 | 0.25 | 0.3 | 3200 | 700 | 4 | 21 | 45 | Without organic component | None |
| Example 10 | 250 | 1.2 | 0.25 | 0.3 | 3200 | 700 | 4 | 21 | 45 | CMC 4% | 1000° C. |
| Example 11 | 250 | 1.2 | 0.25 | 0.3 | 3200 | 700 | 4 | 21 | 45 | CMC 6% | 1000° C. |
| Example 12 | 250 | 1.2 | 0.25 | 0.3 | 3200 | 700 | 4 | 21 | 45 | CMC 8% | 1000° C. |
| Example 13 | 250 | 1.2 | 0.25 | 0.3 | 3200 | 700 | 4 | 21 | 45 | CMC 10% | 1000° C. |
| Example 14 | 250 | 1.2 | 0.25 | 0.3 | 3200 | 700 | 4 | 21 | 45 | CMC 12% | 1000° C. |
| Example 15 | 250 | 1.2 | 0.25 | 0.3 | 3200 | 700 | 4 | 21 | 45 | CMC 15% | 1000° C. |
| Example 16 | 250 | 1.2 | 0.25 | 0.3 | 3200 | 700 | 4 | 21 | 45 | CMC 17% | 1000° C. |
| Example 17 | 250 | 1.2 | 0.25 | 0.3 | 3200 | 700 | 4 | 21 | 45 | CMC 20% | 1000° C. |
| Example 18 | 250 | 1.2 | 0.25 | 0.3 | 3200 | 700 | 4 | 17 | 32 | Without organic component | None |
| Example 19 | 250 | 1.2 | 0.25 | 0.3 | 3200 | 700 | 6 | 14 | 28 | Without organic component | None |
| Example 20 | 250 | 1.2 | 0.25 | 0.3 | 3200 | 700 | 8 | 11 | 18 | Without organic component | None |
| Example 21 | 700 | 2 | 1 | 2 | 2700 | 400 | 2 | 18 | 41 | Without organic component | None |
| Example 22 | 500 | 2 | 1 | 2 | 2700 | 400 | 3 | 19 | 43 | Without organic component | None |
| Example 23 | 300 | 2 | 1 | 2 | 2700 | 400 | 3 | 20 | 44 | Without organic component | None |
| Example 24 | 250 | 2 | 1 | 2 | 2700 | 400 | 4 | 21 | 45 | Without organic component | None |
| Example 25 | 300 | 2.5 | 0.5 | 1.25 | 3000 | 500 | 8 | 11 | 18 | CMC 8% | 1000° C. |
| Comparative Example 1 | 500 | 3.5 | 1 | 3.5 | 2800 | 300 | 2 | 24 | 50 | Without organic component | None |
| Comparative Example 2 | 250 | 1 | 0.25 | 0.25 | 3300 | 500 | 4 | 21 | 45 | Without organic component | None |

TABLE 1-continued

| | Planetary BM pulverization (rpm) | Load applied to rotary rotor (kW) | Treatment time (h) | Powder treatment condition (kW – h) | Annealing temperature (° C.) | Calender line pressure (kg/cm) | D10 | D50 | D90 | Amount of organic component | Heat treatment temperature |
|---|---|---|---|---|---|---|---|---|---|---|---|
| Comparative Example 3 | 250 | 1 | 0.2 | 0.2 | 3300 | 500 | 4 | 21 | 45 | Without organic component | None |
| Comparative Example 4 | 500 | 2 | 1 | 2 | 2700 | 900 | 2 | 24 | 50 | Without organic component | None |
| Comparative Example 5 | 300 | 0.5 | 0.5 | 0.25 | 3300 | 400 | 3 | 21 | 48 | Without organic component | None |

TABLE 2

| | Degree of graphitization I(101)/I(100) | Degree of orientation I(002)/I(110) | Crystallite size Lc004(Å) | R value ID/IG | Cumulative pore volume Cumulative pore volume in range of 0.1 μm to 10 μm [cc/g] | Discharging rate characteristics 3 C capacity retention ratio [%] | 1.5 C charge 5° C. Precipitation of Li on negative electrode |
|---|---|---|---|---|---|---|---|
| Example 1 | 1.01 | 51 | 240 | 0.02 | 0.05 | 86 | No |
| Example 2 | 1.06 | 53 | 250 | 0.02 | 0.05 | 87 | No |
| Example 3 | 1.1 | 64 | 301 | 0.02 | 0.05 | 93 | No |
| Example 4 | 1.15 | 72 | 432 | 0.02 | 0.05 | 90 | No |
| Example 5 | 1.2 | 88 | 492 | 0.03 | 0.05 | 92 | No |
| Example 6 | 1.31 | 107 | 527 | 0.03 | 0.05 | 93 | No |
| Example 7 | 1.35 | 122 | 599 | 0.03 | 0.05 | 92 | No |
| Example 8 | 1.42 | 135 | 610 | 0.03 | 0.05 | 83 | No |
| Example 9 | 1.49 | 149 | 629 | 0.03 | 0.05 | 82 | No |
| Example 10 | 1.49 | 149 | 629 | 0.04 | 0.05 | 83 | No |
| Example 11 | 1.49 | 149 | 629 | 0.05 | 0.05 | 90 | No |
| Example 12 | 1.49 | 149 | 629 | 0.25 | 0.05 | 92 | No |
| Example 13 | 1.49 | 149 | 629 | 0.46 | 0.05 | 93 | No |
| Example 14 | 1.49 | 149 | 629 | 0.73 | 0.06 | 91 | No |
| Example 15 | 1.49 | 149 | 629 | 0.88 | 0.06 | 92 | No |
| Example 16 | 1.49 | 149 | 629 | 1 | 0.06 | 91 | No |
| Example 17 | 1.49 | 149 | 629 | 1.12 | 0.06 | 81 | No |
| Example 18 | 1.49 | 149 | 629 | 0.03 | 0.06 | 92 | No |
| Example 19 | 1.49 | 149 | 629 | 0.03 | 0.07 | 90 | No |
| Example 20 | 1.49 | 149 | 629 | 0.03 | 0.09 | 91 | No |
| Example 21 | 1.15 | 72 | 290 | 0.02 | 0.05 | 82 | No |
| Example 22 | 1.15 | 72 | 302 | 0.02 | 0.05 | 92 | No |
| Example 23 | 1.15 | 72 | 598 | 0.02 | 0.05 | 93 | No |
| Example 24 | 1.15 | 72 | 610 | 0.02 | 0.05 | 81 | No |
| Example 25 | 1.31 | 107 | 527 | 0.25 | 0.09 | 95 | No |
| Comparative Example 1 | 0.9 | 38 | 230 | 0.02 | 0.05 | 72 | Yes |
| Comparative Example 2 | 1.6 | 108 | 660 | 0.03 | 0.05 | 73 | Yes |
| Comparative Example 3 | 1.65 | 108 | 665 | 0.03 | 0.05 | 68 | Yes |
| Comparative Example 4 | 1.15 | 162 | 266 | 0.02 | 0.05 | 71 | Yes |
| Comparative Example 5 | 1.6 | 53 | 612 | 0.03 | 0.05 | 65 | Yes |

Based on Table 1 and Table 2, it can be seen that, in all data of Examples 1 to 9 and Comparative Examples 1 to 5, when a calender line pressure was 300 kg/cm, a degree of orientation was about 40 to 50 (Example 1 and Comparative Example 1), and when the calender line pressure was larger than 300 kg/cm, the degree of orientation became larger, when the calender line pressure was 700 kg/cm, the degree of orientation was about 150 (Example 9), and when the calender line pressure was 900 kg/cm, the degree of orientation was about 160 (Comparative Example 4). In addition, comparing Example 4 and Comparative Example 4, loads applied to the rotary rotor and treatment times therefor were the same and values of degrees of graphitization in which such results were reflected were the same. However, the degree of orientation was 72 in Example 4, but was 162 in Comparative Example 4 which reflected the fact that the calender line pressure was 400 kg/cm in Example 4 and 900 kg/cm in Comparative Example 4. As described above, the degree of orientation could be adjusted by adjusting the calender line pressure.

In production conditions of the present example, in order to set the degree of orientation of the carbon particles to be within a range of 50 to 150, the calender line pressure could be adjusted to be within a range of about 300 to 700.

In addition, based on Table 1 and Table 2, it can be seen that, when a rotational speed of the planetary ball mill was 500 rpm, the crystallite diameter (crystallite size) was 230 to 301 (Examples 1 to 3 and Comparative Examples 1 and 4), when the crystallite diameter was less than 230 to 301, the crystallite diameter became larger, when the rotational speed was 400 rpm, the crystallite diameter was 432 to 492 (Examples 4 and 5), when the rotational speed was 300 rpm, the crystallite diameter was 527 to 612 (Examples 6 to 8, and Comparative Example 5), and when the rotational speed was 250 rpm, the crystallite diameter was 629 to 665 (Example 9 and Comparative Examples 2 and 3). As described above, the crystallite diameter could be adjusted by a rotational speed of the planetary ball mill.

In production conditions of the present example, in order to set the crystallite diameter (crystallite size) of the carbon particles to be within a range of 300 to 600, the rotational speed of the planetary ball mill could be adjusted to be within a range of about 250 to 500 rpm.

In addition, in Table 1 and Table 2, based on Examples 1 to 9, it can be seen that, when an amount of work (powder treatment condition) represented by a product of a load (kW) applied to the rotary rotor and a treatment time (h) therefor was reduced from 3 kW·h to 0.3 kW·h, the degree of graphitization simply increased from 1.01 to 1.49. In this case, when the powder treatment condition was reduced from 3 kW·h to 0.3 kW·h, the annealing temperature increased from 2400° C. to 3200° C. Based on Examples 1 to 9, when the powder treatment condition was set to be within a range of 0.3 to 3 kW·h and the annealing temperature was adjusted to be within a range of 2400° C. to 3200° C., the degree of graphitization could be in a range of 1.0 to 1.5. Here, in order to set the powder treatment condition to be within a range of 0.3 to 3 kW·h, a load applied to the rotary rotor could be set within a range of 1.2 to 3 kW, and a treatment time therefor could be set to 0.25 hours to 1 hour.

On the other hand, based on Comparative Example 1, when the powder treatment condition was 3.5 kW·h, even if the annealing temperature was set to 2800° C., the degree of graphitization increased only to 0.9, and was not in a range of 1.0 to 1.5. In addition, based on Comparative Examples 2, 3, and 5, when the powder treatment condition was 0.2 kW·h or 0.25 kW·h, if the annealing temperature was set to 3300° C., the degree of graphitization became 1.6 or more, and was not in a range of 1.0 to 1.5. Here, in Comparative Examples 2 and 5, it is thought that, loads applied to the rotary rotor and treatment times therefor were different, but powder treatment conditions which are a product of the load applied to the rotary rotor and the treatment time were the same at 0.25 kW·h, and degrees of graphitization in which such results were reflected were the same at a value of 1.6.

It can be seen that, in Comparative Examples 1 to 5, the 3 C capacity retention ratio was 73% or less, and in Examples 1 to 9 in which the negative electrode according to the present invention was used, the 3 C capacity retention ratio was 82% or more, and the rapid charging characteristics were favorable. In addition, precipitation of lithium on the negative electrode was observed in Comparative Examples 1 to 5, but precipitation of lithium on the negative electrode was not observed in Examples 1 to 9.

Among Examples 1 to 9, in Examples 3 to 8, the 3 C capacity retention ratio was 90% or more. When the degree of graphitization was set to 1.1 to 1.35 and the degree of orientation was set to 64 to 122, no lithium precipitated on the negative electrode and the 3 C capacity retention ratio was 90% or more.

Comparing Example 9 and Examples 10 to 17, it can be seen that, even if the degree of graphitization was 1.49, the degree of orientation was 149, and the crystallite diameter Lc004 exceeded 600 Å, when the R value was set to 0.05 or more and 1.0 or less, the discharging rate characteristics could be 90% or more.

In addition, Comparing Example 9 and Examples 18 to 20, it can be seen that, even if the degree of graphitization was 1.49, the degree of orientation was 149, the crystallite diameter Lc004 exceeded 600 Å, and the R value was 0.05, when the cumulative pore volume was 0.06 cc/g or more, the discharging rate characteristics were 90% or more.

Comparing Example 4 and Examples 21 to 24, it can be seen that, when the degree of graphitization was 1.15, the degree of orientation was 72, the R value was 0.02, and only the crystallite diameter Lc004 was adjusted while the cumulative pore volumes were left at 0.05 cc/g, the discharging rate characteristics could be adjusted from 81% to 93%.

In Example 25, the highest discharging characteristic rate (95%) among the examples was obtained.

Based on the results shown in Table 1 and Table 2, parameters of the degree of graphitization, the degree of orientation, the crystallite diameter, the R value, and the cumulative pore volume can be independently adjusted and when the parameters are combined in appropriate ranges, it is possible to provide a negative electrode for a lithium secondary battery through which precipitation of Li is prevented and which has excellent input and output characteristics and a lithium ion secondary battery using the same.

EXPLANATION OF REFERENCES

10 Separator
20 Positive electrode
22 Positive electrode current collector
24 Positive electrode active material layer
30 Negative electrode
32 Negative electrode current collector
34 Negative electrode active material layer
36 Negative electrode active material
40 Laminate
50 Case
60, 62 Lead
100 Lithium ion secondary battery

What is claimed is:

1. A negative electrode of a lithium ion secondary battery comprising a current collector and a negative electrode active material layer provided on the current collector,
   wherein the negative electrode active material layer includes carbon particles,
   wherein a degree of graphitization of the carbon particles is 1.0 or more and 1.5 or less, and
   wherein a degree of orientation of the carbon particles is 50 or more and 150 or less;
   where, the degree of graphitization is a ratio (P101/P100) between a peak intensity P101 of the (101) plane and a peak intensity P100 of the (100) plane in an X-ray diffraction pattern, and the degree of orientation is a ratio (P002/P110) between a peak intensity P002 of the (002) plane and a peak intensity P110 of the (110) plane in an X-ray diffraction pattern.

2. The negative electrode of a lithium ion secondary battery according to claim 1, wherein a crystallite size Lc004 of the carbon particles in a C axis direction in an X-ray diffraction pattern is 300 Å or more and 600 Å or less.

3. The negative electrode of a lithium ion secondary battery according to claim 1,
wherein an R value of the carbon particles is 0.05 or more and 1.0 or less;
where, the R value is a ratio ($I_D/I_G$) between an intensity ($I_D$) of a peak in a range of 1300 to 1400 cm$^{-1}$ and an intensity ($I_G$) of a peak in a range of 1580 to 1620 cm$^{-1}$ measured in a Raman spectroscopy spectrum.

4. The negative electrode of a lithium ion secondary battery according to claim 2,
wherein an R value of the carbon particles is 0.05 or more and 1.0 or less;
where, an R value is a ratio ($I_D/I_G$) between an intensity ($I_D$) of a peak in a range of 1300 to 1400 cm$^{-1}$ and an intensity ($I_G$) of a peak in a range of 1580 to 1620 cm$^{-1}$ measured in a Raman spectroscopy spectrum.

5. The negative electrode of a lithium ion secondary battery according to claim 1,
wherein the negative electrode active material layer has at least one peak in a range of a pore size of 0.1 μm or more and 10 μm or less in a pore size distribution curve obtained through mercury intrusion porosimetry, and
wherein a cumulative pore volume in a range of a pore size of 0.1 μm or more and 10 μm or less is 0.06 cc/g or more.

6. The negative electrode of a lithium ion secondary battery according to claim 2,
wherein the negative electrode active material layer has at least one peak in a range of a pore size of 0.1 μm or more and 10 μm or less in a pore size distribution curve obtained through mercury intrusion porosimetry, and
wherein a cumulative pore volume in a range of a pore size of 0.1 μm or more and 10 μm or less is 0.06 cc/g or more.

7. The negative electrode of a lithium ion secondary battery according to claim 3,
wherein the negative electrode active material layer has at least one peak in a range of a pore size of 0.1 μm or more and 10 μm or less in a pore size distribution curve obtained through mercury intrusion porosimetry, and
wherein a cumulative pore volume in a range of a pore size of 0.1 μm or more and 10 μm or less is 0.06 cc/g or more.

8. The negative electrode of a lithium ion secondary battery according to claim 4,
wherein the negative electrode active material layer has at least one peak in a range of a pore size of 0.1 μm or more and 10 μm or less in a pore size distribution curve obtained through mercury intrusion porosimetry; and
wherein a cumulative pore volume in a range of a pore size of 0.1 μm or more and 10 μm or less is 0.06 cc/g or more.

9. A lithium ion secondary battery comprising the negative electrode of a lithium ion secondary battery according to claim 1, a positive electrode, and an electrolyte.

* * * * *